(12) United States Patent
Gillengerten

(10) Patent No.: US 10,508,545 B2
(45) Date of Patent: Dec. 17, 2019

(54) AXIAL IMPELLER WITH ROTATING HOUSING AND POSITIONABLE BLADES

(71) Applicant: Alan Robert Gillengerten, Oceanside, CA (US)

(72) Inventor: Alan Robert Gillengerten, Oceanside, CA (US)

( * ) Notice: Subject to any disclaimer, the term of this patent is extended or adjusted under 35 U.S.C. 154(b) by 536 days.

(21) Appl. No.: 15/232,627

(22) Filed: Aug. 9, 2016

(65) Prior Publication Data

US 2017/0328205 A1    Nov. 16, 2017

Related U.S. Application Data

(60) Provisional application No. 62/334,319, filed on May 10, 2016.

(51) Int. Cl.

| F01D 5/03 | (2006.01) |
|---|---|
| F03B 3/14 | (2006.01) |
| F03D 1/06 | (2006.01) |
| F03D 5/02 | (2006.01) |
| F03B 3/12 | (2006.01) |
| F01D 25/16 | (2006.01) |
| F01D 7/00 | (2006.01) |
| F03D 80/70 | (2016.01) |

(Continued)

(52) U.S. Cl.
CPC .............. *F01D 5/03* (2013.01); *F01D 7/00* (2013.01); *F01D 25/162* (2013.01); *F03B 3/06* (2013.01); *F03B 3/123* (2013.01); *F03B 17/061* (2013.01); *F03D 1/0658* (2013.01); *F03D 5/02* (2013.01); *F03D 80/70* (2016.05); *F05B 2240/30* (2013.01); *F05B 2240/33* (2013.01); *F05B 2250/02* (2013.01); *F05B 2250/231* (2013.01); *F05B 2260/4021* (2013.01); *F05B 2260/4031* (2013.01); *F05B 2260/76* (2013.01); *F05B 2260/79* (2013.01); *Y02E 10/223* (2013.01); *Y02E 10/28* (2013.01)

(58) Field of Classification Search
CPC .......... F01D 5/03; F01D 7/00; F01D 25/1623; F03B 3/06; F03B 3/123; F03B 17/061; F03D 5/02; F03D 80/70; F03D 1/0658; F05B 2240/33; F05B 2240/302; F05B 2260/4021; F05B 2260/4031
See application file for complete search history.

(56) References Cited

U.S. PATENT DOCUMENTS

| 3,441,088 A * | 4/1969 | Levy .................. B63H 5/14 415/74 |
|---|---|---|
| 3,487,805 A * | 1/1970 | Satterthwaite .......... B63H 5/14 114/151 |

(Continued)

*Primary Examiner* — Ninh H. Nguyen
(74) *Attorney, Agent, or Firm* — Patent Law & Venture Gp.; Gene Scott

(57) ABSTRACT

An axial impeller has a tubular housing mounted on bearings for rotation. The housing is capable of engaging a motor or generator directly or through a drive belt. Interior turbine blades are mounted on the housing wall. The blades may be hinged so they can rotate between a retracted position adjacent to the wall and an extended radial position. Rods penetrate the wall to position the blades between retracted and extended positions. When extended, the blades may be rotated to propel a fluid through the housing; and when retracted natural fluid flow is less restricted.

4 Claims, 2 Drawing Sheets

(51) Int. Cl.
F03B 3/06 (2006.01)
F03B 17/06 (2006.01)

(56) References Cited

U.S. PATENT DOCUMENTS

| | | | | |
|---|---|---|---|---|
| 3,804,553 | A | * | 4/1974 | Hickey, Jr. ................ F04D 3/02 |
| | | | | 29/889 |
| 4,648,788 | A | * | 3/1987 | Jochum .................... B63H 1/16 |
| | | | | 415/124.1 |
| 4,822,308 | A | * | 4/1989 | Rochester ................ B63H 1/16 |
| | | | | 416/189 |
| 4,941,802 | A | * | 7/1990 | Ross ........................ B63H 1/16 |
| | | | | 416/164 |
| 5,040,945 | A | * | 8/1991 | Levesque ................ F01D 11/02 |
| | | | | 290/52 |
| 5,573,376 | A | * | 11/1996 | Hayden ................ F04D 29/321 |
| | | | | 29/888.025 |
| 2016/0208766 | A1 | * | 7/2016 | Fei .......................... F03B 13/00 |

* cited by examiner

AXIAL IMPELLER WITH ROTATING HOUSING AND POSITIONABLE BLADES

PRIOR APPLICATIONS

This application, being filed within one year of the filing date of provisional patent application U.S. 62/334,319 filed on May 10, 2016 claims priority thereto and subject matter thereof is incorporated hereinto in its entirety.

FIELD OF THE DISCLOSURE

The field of this disclosure is impeller devices as used, for example, in mixing, homogenizing, pumping, and similar actions.

BACKGROUND

An impeller can be used as the rotating component of a pump or generator, and is usually made of a rigid material such as a metal. It transfers energy from a prime mover such as an electric or gasoline powered motor-generator to a fluid being pumped or to increase the rotational rate of the impeller itself. An Axial flow impeller imposes bulk motion, and typical uses include homogenization processes, in which increased fluid volumetric flow rate is important. Impellers are an integral part of an axial-flow pump used in ventricular assist devices to augment or fully replace cardiac function. Radial flow impellers impose a shear stress to the fluid, and are used, for example, to mix immiscible liquids or, in general, when there is a deformable interface to break, or where mixing of viscous fluids is required.

In propeller type impellers the blades are axial thrust-giving elements providing a high degree of swirling in the vessel. The flow pattern generated in the fluid resembles a helix. In paddle type impellers relatively low velocities are attained. Examples are windmills, water wheels, and washing machine agitators. In turbine type impellers the blades are often exposed to high temperature and pressure and also extreme mechanical stress. Such blades are held at both the cord and tip and usually have a relatively low ratio form factor.

The velocity achieved by the impelled fluid transfers into pressure when the outward movement of the fluid is confined by conductor resistance or receiving apparatus such or valves, diverters, and receivers. Linear impellers may have short cylinders with open inlet and outlet through which a fluid moves. Rotating vanes to push the fluid axially provide increased linear flow motion and builds fluid pressure. In a reverse action an impeller may be driven by the flow of a fluid as for instance in a dam turbine so that the energy of the flowing fluid is converted into turbine rotation most often coupled to an electrical generator.

SUMMARY

In view of the foregoing, an impeller according to the following description and illustrations can have a bearing mounted housing so that its blades and housing rotate as an integral unit. According to an embodiment, a cylindrical housing may have impeller blades attached to its inner wall and extending radially toward the cylinder's center. The blades may be cast as a single part with the housing, or may be fastened to the inside wall or may be hinged to the wall so that they may be extended to a set degree to increase or decrease thrust.

The housing may be bearing mounted so as to rotate easily. It may have exterior linear gear teeth wrapped in a circle around the housing which may be engaged with a drive chain or belt to be driven by a motor or to drive a generator or other apparatus.

The significant benefit of this design is that no central axle is required which reduces assembly complexity and lowers resistance to fluid flow through the housing.

These and other aspects of embodiments herein described will be better appreciated when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated.

BRIEF DESCRIPTION OF THE DRAWINGS

Embodiments of the described apparatus are illustrated only as examples in the figures of the accompanying drawing sheets wherein the same reference numeral refers to the same element as it may appear in multiple drawing sheets.

DETAILED DESCRIPTION

Figure 1:
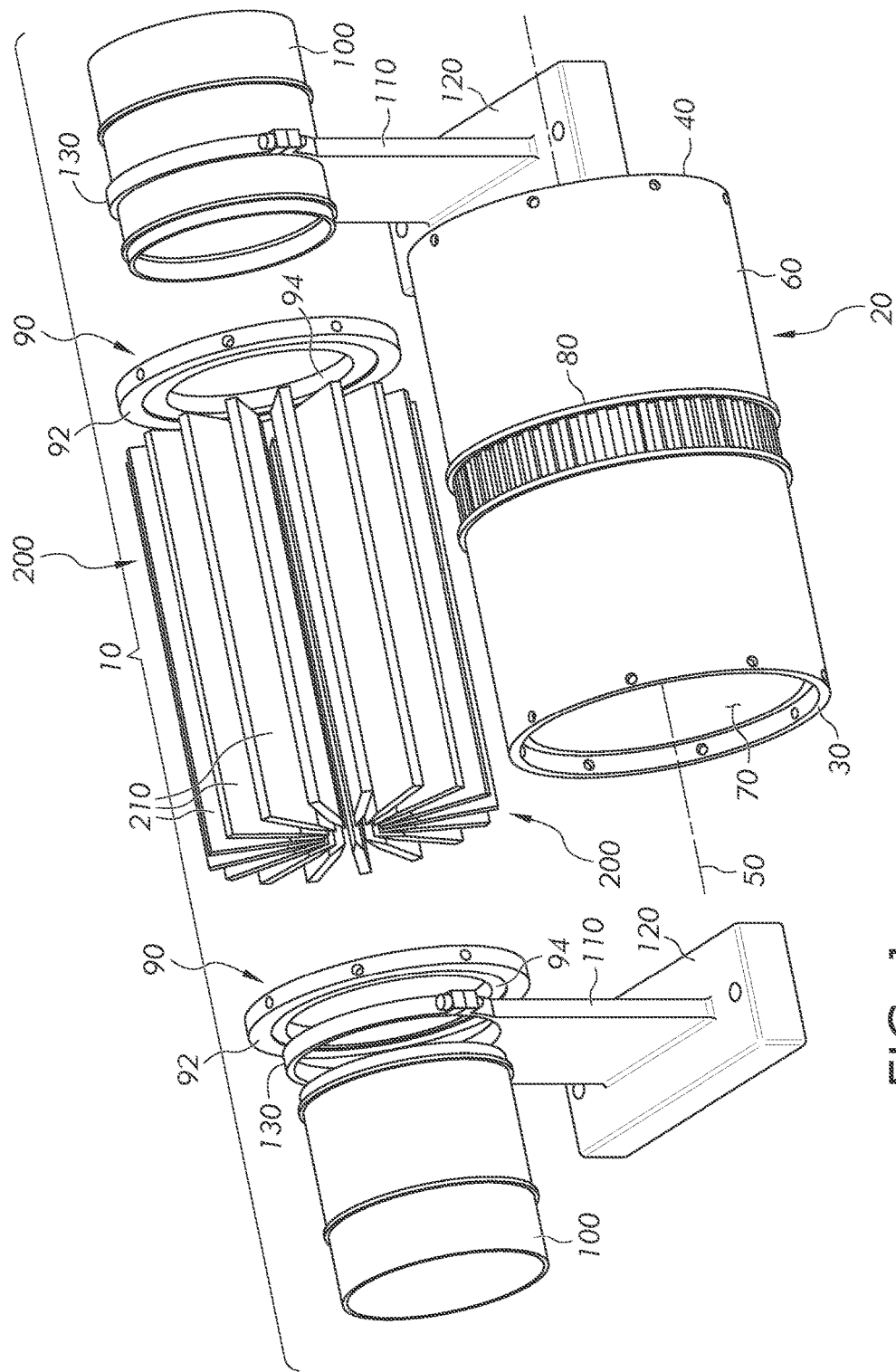
FIG. 1 is an exploded perspective view of an embodiment of an impeller assembly according to the detailed description and particularly showing a full complement of radial impellor blades.

In an embodiment of the present invention shown in FIG. 1, an axial impeller 10 has a tubular housing 20 with opposing open ends 30 and 40, a longitudinal central axis 50, an exterior surface 60 and an interior surface 70; a circumferential drive engagement 80 is integral with exterior surface 60 and may be joined to surface 60 by forming, bonding, fastening and other means known to those of skill. A pair of circular bearing assemblies 90 each have an outer bearing race 92 engaged for mutual rotation with an inner bearing race 94 via ball or roller bearings or other means. The outer bearing races 92 are secured at opposing open ends 30 and 40 of tubular housing 20 where they are free to rotate with housing 20 about inner bearing races 94. Such bearing sets are well known to those of skill in the field of this apparatus. Stationary tubes 100 may be engaged with inner bearing races 94 wherein inner bearing races 94 and tubes 100 may be held stationary against rotation using, for example, fixed stands 110. Stands 110 may be secured to fixed bases 120, and may use band-clamps 130 for encircling tubes 100. This is only one approach to securing tubes 100 against rotation and other approaches will be known to those of skill. A set 200 of turbine blades 210 may be engaged within tubular housing 20 as will be further described below.

Figure 2:
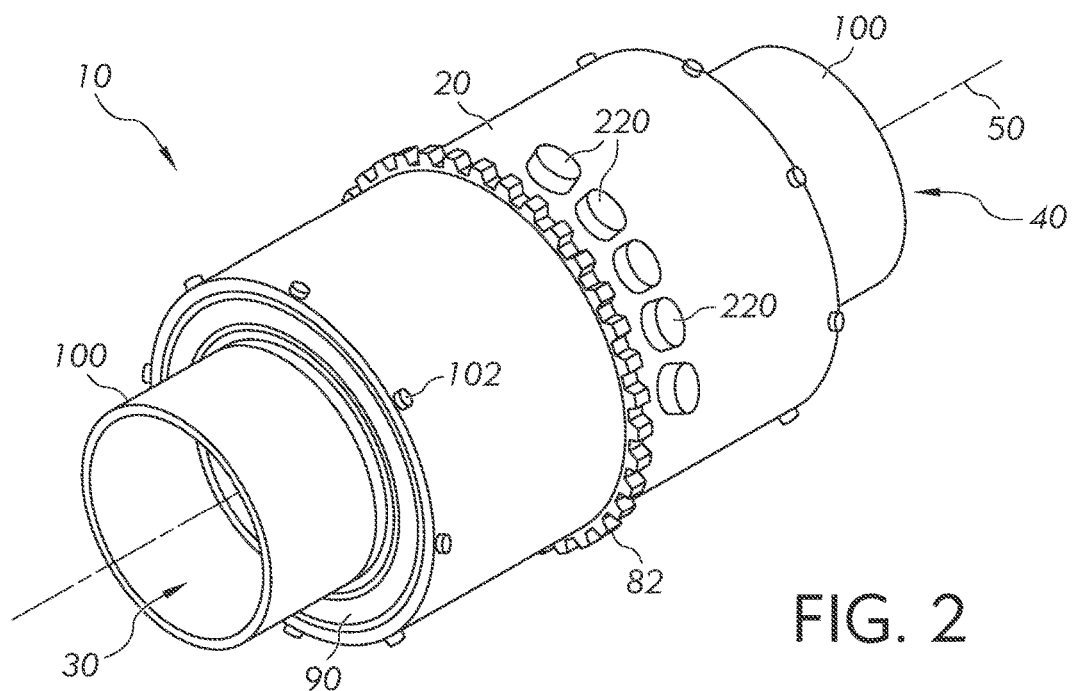
FIG. 2 is a perspective view of a further embodiment thereof shown as fully assembled.

Drive engagement 80 may have a series of steps consisting of spaced-apart ridges as shown in FIG. 1 or alternately may have a series of radial gear teeth 82 as shown in FIG. 2. In either approach or others that may be known to those of skill, will accept a flexible drive belt or drive chain (not shown) in engagement so as to be driven in circuitous rotation as housing 20 rotates, or for driving housing 20. Therefore, such a flexible drive belt or chain may be engaged with an electrical generator or an electric motor (not shown) as would be known to those of skill.

Figure 3:
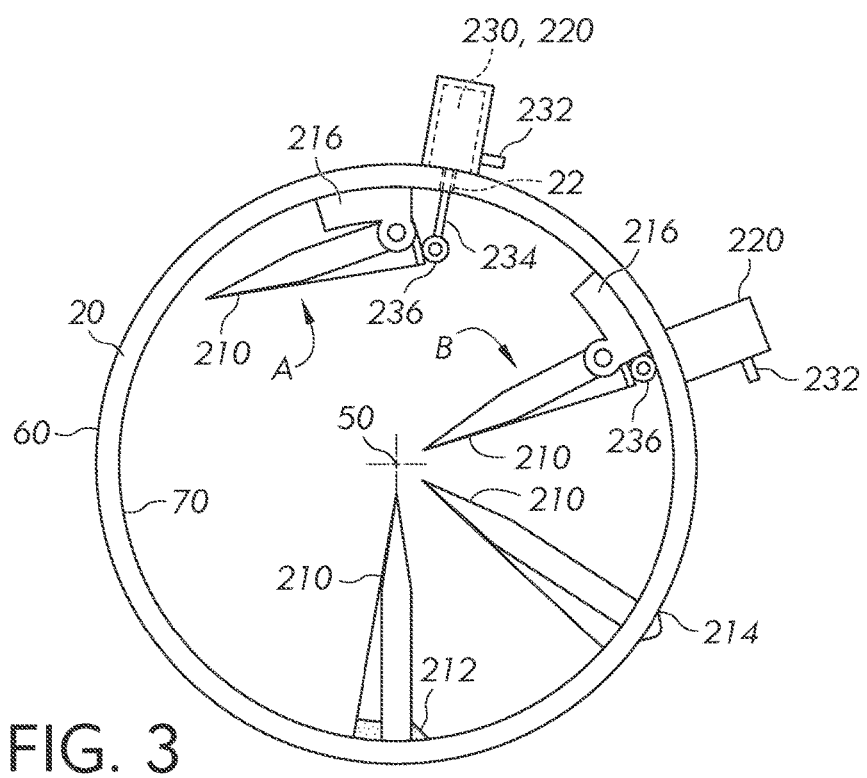
FIG. 3 is an axial view of a tubular housing thereof showing mounting and positioning means of several of the radial turbine blades therein.

As shown in FIG. 3, turbine blades 210 may be secured to housing 20 on interior surface 70 by welds 212 or by fasteners 214, and it is clear that those of skill in the art will find ways of attaching blades 210 by other means. In operation blades 210 may extend radially from interior surface 70 toward axis 50. It is shown at "A" that blades 210 may be placed in a retracted position roughly adjacent to surface 70 and, at "B," in the radial extended position. To accomplish this, as shown, blades 210 may be secured by hinges, so as to rotate between the retracted position "A" and the extended radial position "B".

In an embodiment as shown in FIG. 2, actuators 220 may be mounted on exterior surface 60 and as shown in FIG. 3, each turbine blade 210 may be engaged with an actuator 220 by rod 234 which may be actuated by switch 230. Switch 230 may have two positions; one for extending rod 234 (retracted blade "A") and the other for retracting rod 234 (extended blade "B"). As shown, rod 234 may be engaged with a hinge arrangement 236 at the proximal end of blade 210 which allows blade 210 to pivot about its own hinge pin. A lever 232 may be used to manually change positions of switch 230 between "A" and "B." As shown, rod 234 may extend through an aperture 22 in tubular housing 20 and aperture 22 may be sealed for excluding fluid leakage from housing 20 as would be known by those of skill.

It can be seen that when blades 210 are retracted (position "A"), fluid flow through housing 20 is able to move freely and housing 20 will not rotate; while when blades 210 are extended, as shown at "B," a fluid flow through housing 20 will cause housing 20 to rotate. A prime mover such as an electric motor joined to housing 20 at 80 or 82 by a drive belt will be able to cause fluid flow within housing 20 propelled by turbine blades 210. Likewise, a fluid flow within housing 20 will drive blades 210 into rotation and this mechanical motion may be transferred to an alternator or electric generator. Because actuators 220 may enable adjustment of blades 210 to intermediate positions between "A" and "B" energy transfer may be throttled.

In the foregoing description, embodiments are described as a plurality of individual parts, and methods as a plurality of individual steps and this is solely for the sake of illustration. Accordingly, it is contemplated that some additional parts or steps may be added, some parts or steps may be changed or omitted, and the order of the parts or steps may be re-arranged, while maintaining the sense and understanding of the apparatus and methods as claimed.

What is claimed is:

1. An axial impeller comprising:
   a housing of round tubular construction extensive between proximal and distal ends, said housing having exterior and interior continuous surfaces;
   turbine blades secured to said interior continuous surface, said turbine blades movable between retracted and extended positions;
   actuators mounted on said exterior surface in positions radially opposite said turbine blades;
   linear actuator rods communicate radially between said actuators and said turbine blades through holes in said housing.

2. The axial impeller of claim 1 wherein said turbine blades are secured to said interior surface of said housing by hinges wherein said turbine blades are movable between retracted and extended positions.

3. The axial impeller of claim 2 wherein said turbine blades are each independently movable between positions adjacent to said interior surface of said housing and alternately extending away from said interior surface into radial positions within said housing.

4. The axial impeller of claim 1 wherein said turbine blades are axially extensive between said proximal and distal ends of said housing.

* * * * *